United States Patent [19]  [11] 4,278,642
MacInnis et al.  [45] Jul. 14, 1981

[54] METHOD FOR REMOVING MOLYBDENUM FROM TUNGSTATE SOLUTIONS BY SOLVENT EXTRACTION

[75] Inventors: Martin B. MacInnis; Tai K. Kim, both of Towanda, Pa.

[73] Assignee: GTE Products Corporation, Stamford, Conn.

[21] Appl. No.: 158,670

[22] Filed: Jun. 12, 1980

Related U.S. Application Data

[63] Continuation of Ser. No. 38,974, May 14, 1979, abandoned, and a continuation-in-part of Ser. No. 952,419, Oct. 14, 1978, abandoned.

[51] Int. Cl.$^3$ ............................................. C01G 41/00
[52] U.S. Cl. .................................. 423/54; 75/101 BE; 423/DIG. 14
[58] Field of Search ............... 423/54, DIG. 14, 658.5; 75/101 BE

[56] References Cited

U.S. PATENT DOCUMENTS

| | | |
|---|---|---|
| 3,158,438 | 11/1964 | Kurtak ................................. 423/54 |
| 3,804,941 | 4/1974 | Coad et al. ............................. 423/54 |
| 3,806,580 | 4/1974 | Bradford et al. ....................... 423/54 |
| 4,115,513 | 9/1978 | Kulkarmi et al. ....................... 423/54 |

*Primary Examiner*—Herbert T. Carter
*Attorney, Agent, or Firm*—Robert E. Walter

[57] ABSTRACT

Disclosed is a process for removing molybdenum values from aqueous solutions containing tungsten values comprising sulfidizing said solution to an extent sufficient to convert substantially all of the molybdenum values to a thiomolybdate species, said sulfidizing being substantially less than the extent necessary to convert substantially all of said tungsten values to a thiotungstate species and contacting the resulting solution containing the thiomolybdate complex ion with a suitable amount of an organic extractant for a sufficient period of time to preferentially extract the thiomolybdate complex ion into the organic extractant, said organic extractant comprising an aromatic organic solvent and a quaternary ammonium compound of the formula $R_3(CH_3)N^+A^-$, wherein R is an alkyl group having from about 8 to 10 carbon atoms and A is an anion derived from a mineral acid.

1 Claim, No Drawings

METHOD FOR REMOVING MOLYBDENUM FROM TUNGSTATE SOLUTIONS BY SOLVENT EXTRACTION

This is a continuation of application Ser. No. 38,974, filed May 14, 1979, now abandoned and a continuation-in-part of Ser. No. 952,419 filed Oct. 14, 1978, now abandoned.

The present invention relates to an improved process for removing molybdenum values from an aqueous solution containing tungsten and molybdenum.

PRIOR ART

For a processing tungsten ores it is desirable to remove molybdenum from an aqueous solution containing tungsten values.

According to a process disclosed in U.S. Pat. No. 3,158,438 to Kurtak a process is disclosed for recovering tungsten values from molybdenum contaminated aqueous solutions of tungsten. The molybdenum contaminate is precipitated as molybdenum trisulfide prior to the solvent extraction of tungsten. The molybdenum precipitate is formed by adding an alkali metal sulfide prior to the solvent extraction of tungsten. The molybdenum precipitate is formed by adding an alkali metal sulfide to the tungsten and molybdenum containing solution at a proper pH to convert the molybdenum contaminate to the thiomolybdate complex ion. Acidification of the resulting solution results in the precipitation of molybdenum trisulfide. Tungsten values are then extracted into an organic phase.

U.S. Pat. No. 3,804,941 to Coad et al. relates to a solvent extraction process for the recovery of tungsten. The solution containing tungsten values is sulfidized to convert all of the tungsten to the thiotungstate species. A resulting sulfidized alkaline solution is contacted with an extractant in an organic diluent to extract the tungsten. The amount of extractant employed is disclosed as being from about 1 to 15 percent by weight based on the organic phase with quaternary ammonium chloride being a preferred group of extractants. The extraction process as described is effective for removing relatively low concentrations of tungsten present as the tungstate ion from a brine not disclosed as containing molybdenum values.

U.S. Pat. No. 3,806,590 discloses a process wherein tungsten in an alkaline solution is sulfidized to convert it to a thiotungstate species, contacted with an organic phase comprising an extractant in an organic diluent whereby the thiotungstate is extracted into the organic phase and subsequently recovered. The improvement comprises contacting the thiotungstate containing organic phase with sulfur dioxide whereby at least a portion of the thiotungstate is converted to a tungstate species. The tungstate species is stripped from the organic phase with an aqueous salt solution to recover the tungstate. The starting tungsten solution has a relatively low concentration of tungsten and is not disclosed as containing molybdenum values.

SUMMARY OF THE INVENTION

Accordingly, it is an object of the present invention to remove molybdenum values from tungsten solutions.

According to the present invention, there is provided a process for removing molybdenum values from aqueous solutions containing tungsten values comprising sulfidizing said solution to an extent sufficient to convert substantially all of the molybdenum values to a thiomolybdate species, said sulfidizing being substantially less than the extent necessary to convert substantially all of said tungsten values to a thiotungstate species and contacting the resulting solution containing the thiomolybdate complex ion with a suitable amount of an organic extractant for a sufficient period of time to preferentially extract the thiomolybdate complex ion into the organic extractant, said organic extractant comprising an aromatic organic solvent and a quaternary ammonium compound of the formula $[R_3(CH_3)N]^+ A^-$, wherein R is an alkyl group having from about 8 to 10 carbon atoms and A is an anion derived from a mineral acid.

DETAILED DESCRIPTION

The starting aqueous solution from which it is desired to concentrate the tungsten values and remove impurities includes molybdenum values. The solution may be formed from the ores scheelite or wolframite including ferberite and hubnerite or a concentrate thereof. The ore is ground and digested, such as with an alkaline solution, for a period of time sufficient to dissolve both molybdenum and tungsten. Typical prior art leaching methods employ sodium carbonate to leach out the tungsten values. The digestion of scheelite with soda is preferably conducted at an elevated temperature, say about 130° C. for a period of time sufficient to digest the tungsten and molybdenum to form a solution containing sodium molybdate and sodium tungstate and an insoluble residue. The leach liquid typically has a pH in excess of 8 and comprises less than about 5 grams per liter of sodium molybdate and from about 50 to about 200 grams per liter of sodium tungstate. Minor amounts of various other contaminants are present in the liquor. The present invention is primarily concerned with removing relatively dilute molybdate values from an aqueous solution containing relatively concentrated tungsten values.

The solution is sulfidized by adding sufficient alkali metal sulfide to the leach liquor to result in converting substantially all of the molybdenum values which are in the form of the molybdate ion to a thiomolybdate species. Preferably at least 200 percent of the amount of alkali metal sulfide stoichiometrically required to convert the molybdate ion to a thiomolybdate ion complex having the formula $MoS_4^=$ is added. More preferably alkali metal sulfide is added in excess of about five times or 500 percent the stoichiometric amount. Excesses of greater than 10 times can be used. Included within the term alkali metal sulfide are sodium sulfide, sodium acid sulfide. Hydrogen sulfide may also be used.

Sulfidizing should be carried out to an extent substantially less than the extent necessary to convert substantially all of the tungstate to a thiotungstate species. Preferably less than about 300 percent of the stoichiometric amount of alkali metal sulfide required to convert the tungstate ion to a thiotungstate ion having the formula $WS_4^=$ is added. More preferably alkali metal sulfide is added in an amount less than the stoichiometric amount.

It is desirable to maximize the concentration of the thiomolybdate species and minimize the concentration of the thiotungstate species in the resulting solution since both species are extractable by the extractant utilized according to the present invention at a subsequent step.

As hereinbefore discussed the present invention is particularly effective when extracting molybdenum values from starting solutions having relatively dilute molybdenum values and containing relatively concentrated tungsten values. When tungsten is present in the starting solution as tungstate ions and molybdenum is present as molybdate ions, the molar ratio of tungstate to molybdate present in solution is preferably greater than about 25 to 1. More preferably the molar ratio of tungstate to molybdate is greater than about 40 to 1.

To effectively convert the molybdate ion ($MoO_4^=$) to the thiomolybdate complex ion which is represented by the formula $MoS_4^=$, the pH of the leach liquor should be greater than eight. The resulting solution containing the added alkali metal sulfide preferably has a pH of from about 8.0 to about 9.5 to obtain good extraction. The resulting solution more preferably has a pH from about 8.4 to about 8.6. The use of pH's greater than 10 result in a poor subsequent extraction. The use of lower pH's, on the order of 7.5, result in the formation of an undesirable emulsion.

Generally it is preferred to add the alkali metal sulfide to the leach liquor prior to making a pH adjustment. Satisfactory results may be achieved if the pH adjustment is made prior to the addition of alkali metal sulfide.

The resulting solution containing the thiomolybdate complex ion is contacted with a suitable amount of organic extractant for a sufficient period of time to preferentially extract the thiomolybdate complex ion into the organic extractant. The organic extractant comprises an aromatic organic solvent and an active extractant comprising a quarternary ammonium compound of the formula $[R_3(CH_3)N]^+A^-$, in which R is an alkyl group of from about 8 to about 10 carbon atoms and A is an anion, derived from mineral acids.

Particularly useful as an active extractant is tricaprylyl monomethyl ammonium chloride. Tricaprylyl monomethyl ammonium chloride is sold by General Mills Corporation under the name Aliquat 336. A in the foregoing formula is typically an anion derived from a mineral acid.

The organic solvent is preferably a mixture of alkyl benzenes having molecular weights of either 120, 134 or 140. Typical constituents include trimethyl benzene, ethyl benzene, dimethylethyl benzenes, methyl propyl benzene, tetramethyl benzene, diethyl toluene, dimethylisopropyl benzene and the like. The material is sold under the tradename SC #150 by Buffalo Solvents and Chemical Corporation. In the 1972 edition of *Organic Solvents*, a trade publication of Buffalo Solvents and Chemical Corporation, SC #150 is listed as having a boiling point range of from 183° C. to 210° C., a Flash Point of 151° F. and specific gravity of 0.902. As previously stated the molecular weight of the alkyl benzenes contained in SC #150 are 120, 134 and 140. Thus the total carbon atoms in the alkyl chains attached to the benzene ring are either 3, 4 or 5.

When the organic solvent comprises a mixture of alkyl benzenes and the active extractant is a quaternary ammonium compound as hereinbefore discussed, the molybdenum values as compared to the tungsten values in the sulfidized solution are preferentially extracted. As the volume percent of active extractant is decreased based on a given total extractant volume, active extractant plus organic solvent, the amount of molybdenum and tungsten values extracted as a percentage of these species present in the sulfidized solution decreases.

Preferably an amount of active extractant as a volume percent of total extractant is utilized to result in greater than about 90 percent of the molybdenum values and less than about 5 percent of the tungsten values present in the sulfidized solution being extracted. Based on total volume of extractant, it is preferable to use less than about 3% by volume active extractant to extract a high percentage of molybdenum values and a low percentage of tungsten values from the sulfidized solution. To reduce the tungsten values extracted, it is more preferred to use less than 2% and more preferred to use less than 1% by volume active extractant.

If it is desirable to extract substantially all of the molybdenum values it may be desirable to use greater than about 3% by volume active extractant. Generally the use of active extractant volumes in excess of 5% results in greater than 99% removal of molybdenum values accompanied by the removal of greater than about 10% of the tungsten values.

The ratio of organic extractant to aqueous solution being extracted can be varied within practical limits. Either a batch or continuous process can be utilized. Generally the organic to aqueous volumetric ratios can vary from about 1 to 10 to about 10 to 1.

The organic extractant containing the thiomolybdate complex is separated from the aqueous solution containing tungsten values by permitting a phase separation due to the differences in densities between the aqueous and organic liquids. The aqueous solution containing tungsten may be further processed according to conventional methods to recover sodium tungstate. Typical methods are evaporation to produce crystalline sodium tungstate or treatment with calcium to precipitate calcium tungstate therefrom.

To more fully illustrate the invention, the following example is given. All parts, porportions and percentages are by volume unless otherwise indicated.

EXAMPLE 1

A solution containing 184 grams of sodium tungstate per liter and 1.7 grams of sodium molybdate per liter was prepared. The pH was adjusted to 9.5 by the addition of sodium hydroxide and sodium hydrogen sulfide was added. The appropriate amount of sodium hydrogen sulfide solution was added to each of five one liter samples of the sodium tungstate and molybdate solution to give resulting solutions containing the moles per liter of sodium hydrogen sulfide set forth in column one, of Table I. Each solution was adjusted from a pH of about 8.4–8.6 by slowly adding sulfuric acid. An organic extractant comprising 2.3 percent by volume Aliquat 336 and 97.7 percent by volume SC #150 was prepared. Separate 50 ml. portions of the organic extractant were each mechanically shaken in a 125 milliliter separator funnel for abut 10 minutes with 50 ml. samples of the solutions of column one, Table I. After settling, equal volume of the organic and aqueous phases were analyzed for tungsten and molybdenum content. The following table 1 shows the results when various concentrations of sodium hydrogen sulfide solution is utilized.

The Distribution Ratio is the concentration of the particular material in the organic phase divided by its concentration in the aqueous phase.

TABLE I

| NASH mole/liter | Distribution Ratio of Molybdenum $D_{Mo}$ | Distribution Ratio of Tungsten $D_W$ | Separation Factor $D_{Mo}/D_W$ |
| --- | --- | --- | --- |
| 0.11 | 5.69 | 0.033 | 172 |
| 0.22 | 35.71 | 0.032 | 1116 |
| 0.45 | 170.92 | 0.034 | 5027 |
| 0.67 | 194.77 | 0.036 | 5410 |
| 0.89 | 168.11 | 0.035 | 4803 |

EXAMPLE 2

A solution containing 58 grams of sodium tungstate per liter and 0.8 grams of sodium molybdate per liter was prepared. The pH was adjusted to about 9 by the addition of sodium hydroxide. About 7 grams of sodium hydrosulfide ($NaSH.2H_2O$) which corresponds to about 5 times the stoichiometric amount was added. The pH of the solution was adjusted to about 8.5. Separate 50 ml. portions of the sulfidized solution were extracted with an organic extractant containing the percentage of active Aliquat 336 extractant shown in TABLE II which is a volume percent of the total extractant including SC #150. The samples were shaken, settled, and the organic phase analyzed for tungsten and molybdenum content. The following Table II shows the percent of the total molybdenum and tungsten values present in the sulfidized solution extracted with various percent Aliquat 336 extractants.

TABLE II

| % by Volume Aliquat | % of Molybdenum Values Extracted | % of Tungsten Values Extracted |
| --- | --- | --- |
| 1% | 91.7 | 0.66 |
| 2% | 95.8 | 3.58 |
| 3% | 98.8 | 7.3 |
| 4% | 99.1 | 9.23 |
| 5% | 99.73 | 12.08 |
| 6% | 99.72 | 14.33 |
| 7% | 99.81 | 15.63 |
| 8% | 99.75 | 17.64 |
| 10% | 99.84 | 19.48 |

While there has been shown and described what are considered the preferred embodiments of the present invention, it will be obvious to those skilled in the art that various changes and modifications may be made therein without departing from the scope of the invention as described in the appended claims.

We claim:

1. A process for separating molybdenum values from an aqueous solution containing molybdenum and tungsten values comprising the following steps:
    (1) forming an aqueous solution comprising less than about five grams per liter sodium molybdate and from about fifty to about two hundred grams per liter sodium tungstate;
    (2) sulfidizing said aqueous solution to form a sulfidized solution, said sulfidizing being carried out to an extent sufficient to convert substantially all of the sodium molybdate to sodium thiomolybdenum species, said sulfidizing being substantially less than the extent necessary to convert substantially all of said sodium tungstate to sodium thiotungsten species; and
    (3) contacting said sulfidized solution at a pH of from about eight to about nine and one-half with a suitable amount of organic extractant for a sufficient period of time to preferentially extract greater than ninety percent of the sodium thiomolybdenum species into the organic extractant, said organic extractant consisting essentially of tricaprylyl monomethyl ammonia chloride as the active extractant and the balance being an organic solvent comprising a mixture of alkyl benzenes having total carbon atoms in the alkyl group of from three to five, said active extractant being present as a volume percent of total organic extractant in an amount less than about three percent by volume wherein said volume percent is selected to result in greater than ninety percent of the sodium thiomolybdenum species and less than about five percent of the sodium thiotungsten species present in said solution being extracted.

* * * * *